(12) United States Patent
Varadarajan et al.

(10) Patent No.: US 11,791,862 B2
(45) Date of Patent: *Oct. 17, 2023

(54) DATA ENCODER FOR POWER LINE COMMUNICATIONS

(71) Applicant: TEXAS INSTRUMENTS INCORPORATED, Dallas, TX (US)

(72) Inventors: Badri N Varadarajan, Mountain View, CA (US); Anand Dabak, Plano, TX (US); Il Han Kim, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 31 days.

This patent is subject to a terminal disclaimer.

(21) Appl. No.: 17/315,488

(22) Filed: May 10, 2021

(65) Prior Publication Data

US 2021/0266039 A1 Aug. 26, 2021

Related U.S. Application Data

(63) Continuation of application No. 16/744,376, filed on Jan. 16, 2020, now Pat. No. 11,005,530, which is a continuation of application No. 16/200,928, filed on Nov. 27, 2018, now Pat. No. 10,541,727, which is a continuation of application No. 15/796,442, filed on Oct. 27, 2017, now Pat. No. 10,141,978, which is a continuation of application No. 15/476,587, filed on Mar. 31, 2017, now Pat. No. 9,819,392, which is a
(Continued)

(51) Int. Cl.
*H04L 29/06* (2006.01)
*H04B 3/54* (2006.01)

*H04L 69/22* (2022.01)
*H04L 1/00* (2006.01)
*H04L 69/323* (2022.01)

(52) U.S. Cl.
CPC ............. *H04B 3/54* (2013.01); *H04L 1/0041* (2013.01); *H04L 1/0071* (2013.01); *H04L 69/22* (2013.01); *H04L 69/323* (2013.01)

(58) Field of Classification Search
CPC ..... H04L 69/22; H04L 1/0041; H04L 1/0071; H04B 3/54
See application file for complete search history.

(56) References Cited

U.S. PATENT DOCUMENTS 430,934 A 6/1890 Edison
4,302,750 A 11/1981 Wadhwani et al.
(Continued)

*Primary Examiner* — Maharishi V Khirodhar
*Assistant Examiner* — Kenneth P Hunt
(74) *Attorney, Agent, or Firm* — Mandy Barsilai Fernandez; Frank D. Cimino

(57) ABSTRACT

In a disclosed embodiment, a power line communication (PLC) transmitter includes a forward error correction (FEC) encoder that receives payload data and adds parity information to the data to create an encoded output, a fragmenter that receives the encoded output from the FEC encoder and segments the encoded output into a plurality of fragments, a fragment repetition encoder that receives the plurality of fragments from the fragmenter and copies each of the fragments a selected number of times, and an interleaver that receives the copies of the plurality of fragments from the fragment repetition encoder and interleaves the copies of the plurality of fragments for transmission on a power line.

22 Claims, 8 Drawing Sheets

Related U.S. Application Data continuation of application No. 14/798,576, filed on Jul. 14, 2015, now Pat. No. 9,667,318, which is a continuation of application No. 13/101,938, filed on May 5, 2011, now Pat. No. 9,112,753.

(60) Provisional application No. 61/443,326, filed on Feb. 16, 2011, provisional application No. 61/418,955, filed on Dec. 2, 2010, provisional application No. 61/416,809, filed on Nov. 24, 2010, provisional application No. 61/392,677, filed on Oct. 13, 2010, provisional application No. 61/391,407, filed on Oct. 8, 2010, provisional application No. 61/388,863, filed on Oct. 1, 2010, provisional application No. 61/383,960, filed on Sep. 17, 2010, provisional application No. 61/372,646, filed on Aug. 11, 2010, provisional application No. 61/363,003, filed on Jul. 9, 2010, provisional application No. 61/360,559, filed on Jul. 1, 2010, provisional application No. 61/333,601, filed on May 11, 2010, provisional application No. 61/333,614, filed on May 11, 2010.

(56) References Cited

U.S. PATENT DOCUMENTS

| | | |
|---|---|---|
| 4,611,274 A | 9/1986 | Machino et al. |
| 4,700,343 A | 10/1987 | Champarnaud et al. |
| 5,828,293 A | 10/1998 | Rickard |
| 6,278,685 B1 | 8/2001 | Yonge, III et al. |
| 6,314,456 B1 | 11/2001 | Van Andel et al. |
| 6,421,540 B1 | 7/2002 | Gilhousen et al. |
| 6,516,435 B1 | 2/2003 | Tsunoda |
| 6,559,757 B1 | 5/2003 | Deller et al. |
| 7,409,626 B1 | 8/2008 | Schelstraete |
| 7,418,042 B2 | 8/2008 | Choi et al. |
| 7,519,124 B2 | 4/2009 | Oksman |
| 7,746,842 B2 | 6/2010 | Sugaya |
| 8,276,025 B2 | 9/2012 | Razazian et al. |
| 9,112,753 B2 | 8/2015 | Varadarajan et al. |
| 9,667,318 B2 | 5/2017 | Varadarajan et al. |
| 9,819,392 B2 | 11/2017 | Varadarajan et al. |
| 10,141,978 B2 | 11/2018 | Varadarajan et al. |
| 10,541,727 B2 | 1/2020 | Varadarajan et al. |
| 11,005,530 B2 * | 5/2021 | Varadarajan .......... H04L 1/0041 |
| 2002/0022468 A1 | 2/2002 | Yoon et al. |
| 2003/0133473 A1 | 7/2003 | Manis et al. |
| 2005/0157803 A1 | 7/2005 | Kim et al. |
| 2005/0180369 A1 | 8/2005 | Hansen et al. |
| 2006/0039398 A1 | 2/2006 | Iwamura |
| 2006/0256846 A1 | 11/2006 | Oksman et al. |
| 2007/0058732 A1 | 3/2007 | Riedel et al. |
| 2008/0037540 A1 | 2/2008 | Ngo et al. |
| 2008/0273521 A1 | 11/2008 | Shao et al. |
| 2009/0003418 A1 | 1/2009 | Karabinis |
| 2009/0088148 A1 | 4/2009 | Chung et al. |
| 2009/0092087 A1 | 4/2009 | Walton et al. |
| 2009/0262757 A1 | 10/2009 | Rainish |
| 2010/0303096 A1 | 12/2010 | Kasher et al. |
| 2010/0318878 A1 | 12/2010 | Mansour |
| 2011/0182254 A1 | 7/2011 | Kim et al. |
| 2013/0254618 A1 | 9/2013 | Oksman et al. |
| 2014/0029645 A1 | 1/2014 | Yonge, III et al. |

* cited by examiner

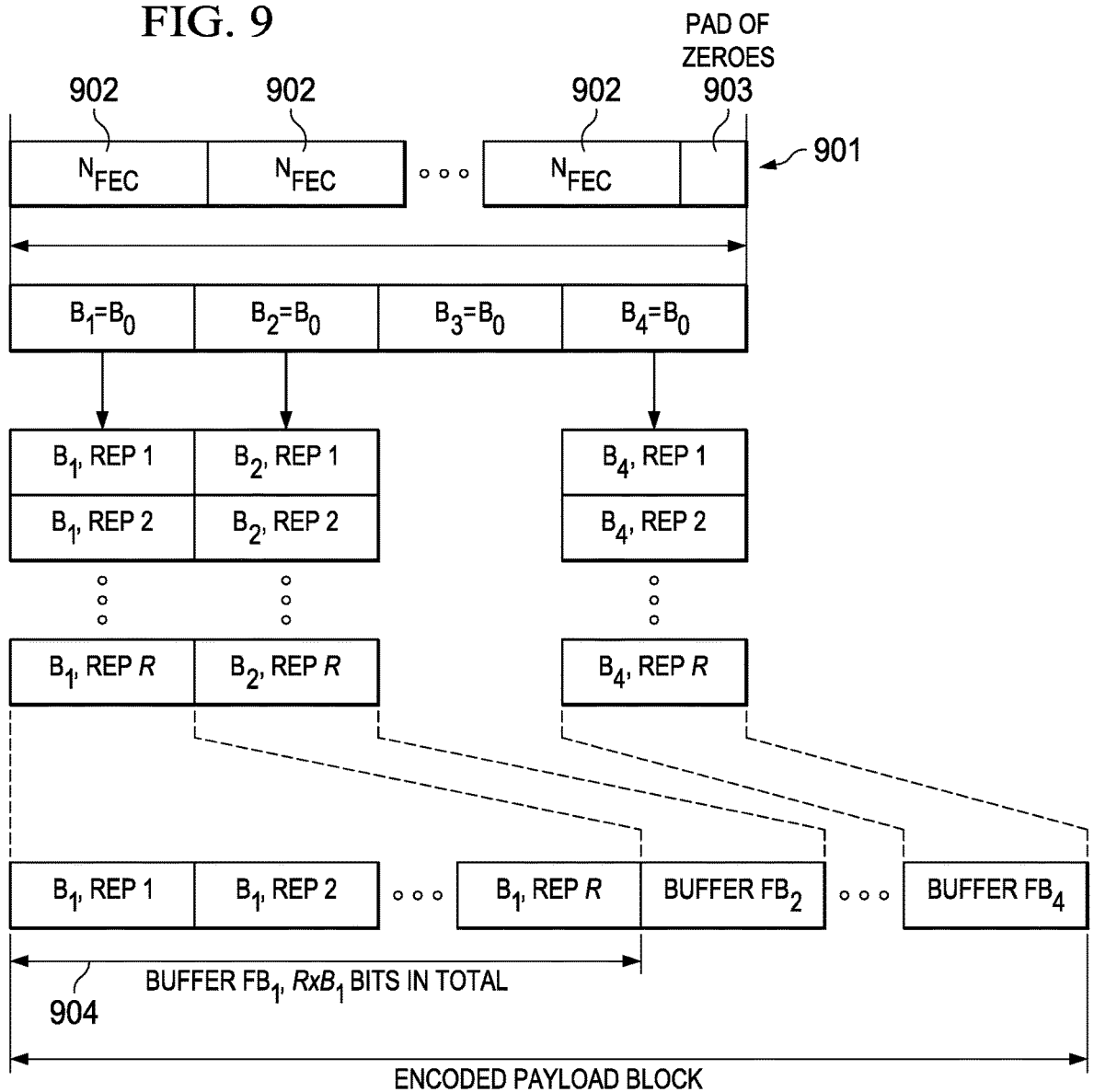

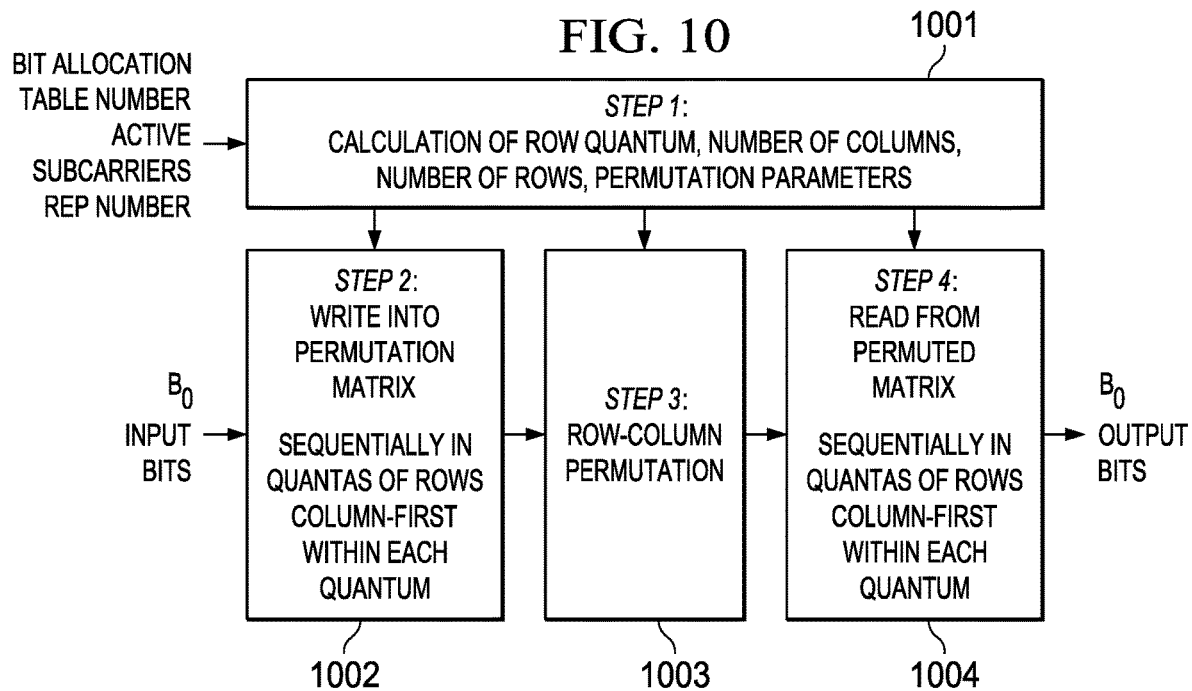
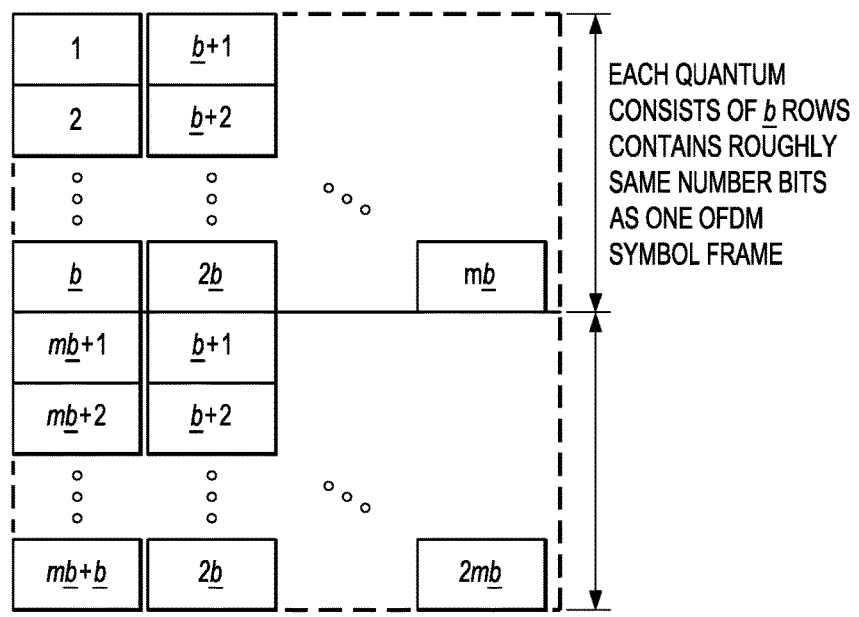

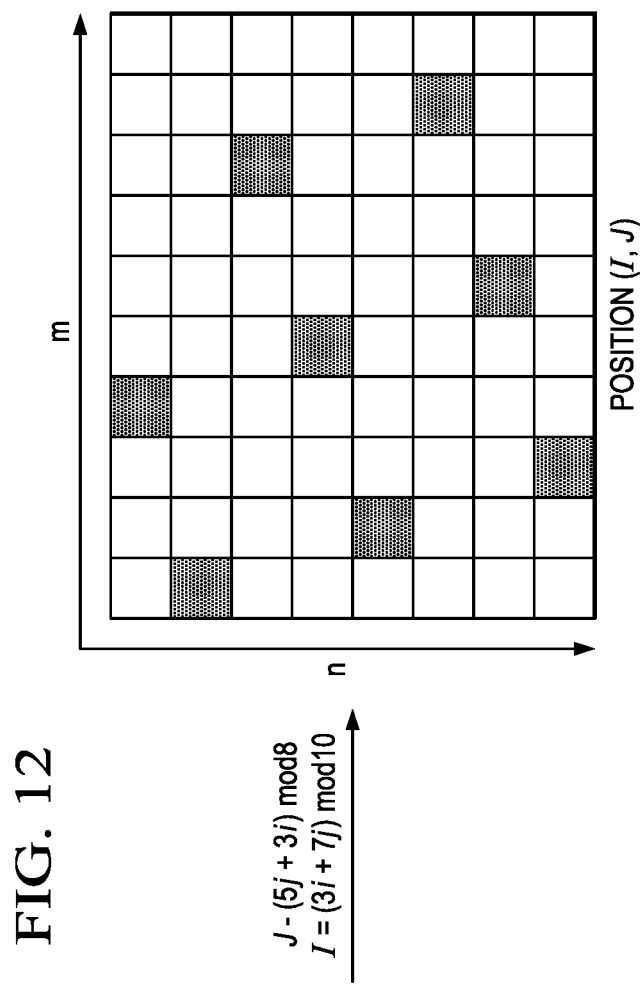
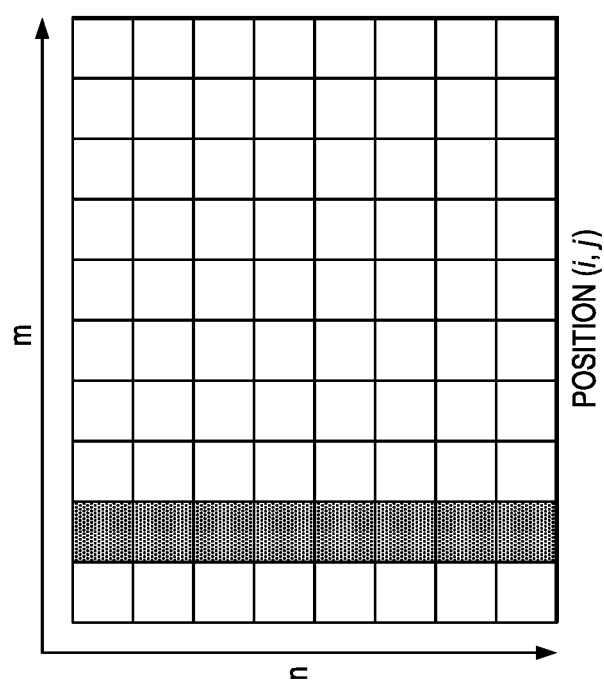
FIG. 12

DATA ENCODER FOR POWER LINE COMMUNICATIONS

CROSS-REFERENCE TO RELATED APPLICATIONS

This application is a continuation of and claims priorIty to U.S. patent application Ser. No. 16/744,376 filed on Jan. 16, 2020, which is a continuation of and claims priorIty to U.S. patent application Ser. No. 16/200,928 filed on Nov. 27, 2018 (now U.S. Pat. No. 10,541,727), which is a continuation of and claims priorIty to U.S. patent application Ser. No. 15/796,442 filed on Oct. 27, 2017 (now U.S. Pat. No. 10,141,978), which is a continuation of and claims priorIty to U.S. patent application Ser. No. 15/476,587, filed Mar. 31, 2017 (now U.S. Pat. No. 9,819,392), which is a continuation of and claims priorIty to U.S. patent application Ser. No. 14/798,576, filed Jul. 14, 2015 (now U.S. Pat. No. 9,667,318), which is a continuation of and claims priorIty to U.S. patent application Ser. No. 13/101,938, filed May 5, 2011 (now U.S. Pat. No. 9,112,753), which in turn claims priorIty to U.S. Provisional Application No. 61/443,326, which is titled "Header and Method for ITU G-HNEM" and was filed Feb. 16, 2011; U.S. Provisional Application No. 61/418,955, which is titled "Interleaver Design and Method for ITU G.HNEM" and was filed Dec. 2, 2010; U.S. Provisional Application No. 61/416,809, which is titled "Interleaver Design and Method for ITU G.HNEM" and was filed Nov. 24, 2010; U.S. Provisional Application No. 61/392,677, which is titled "Interleaver Design and Method for ITU G.HNEM" and was filed Oct. 13, 2010; U.S. Provisional Application No. 61/391,407, which is titled "Interleaver Design and Method for ITU G.HNEM" and was filed Oct. 8, 2010; U.S. Provisional Application No. 61/388,863, which is titled "Interleaver Design and Method for ITU G.HNEM" and was filed Oct. 1, 2010; U.S. Provisional Application No. 61/383,960, which is titled "Interleaver Design and Method for ITU G.HNEM" and was filed Sep. 17, 2010; U.S. Provisional Application No. 61/372,646, which is titled "Interleaver Design and Method for ITU G.HNEM" and was filed Aug. 11, 2010; U.S. Provisional Application No. 61/363,003, which is titled "Header and Method for ITU G-HNEM" and was filed Jul. 9, 2010; U.S. Provisional Application No. 61/360,559, which is titled "Interleaver Design and Method for ITU G.HNEM" and was filed Jul. 1, 2010; U.S. Provisional Application No. 61/333,614, which is titled "Interleaver Design and Method for ITU G.HNEM" and was filed May 11, 2010; and U.S. Provisional Application No. 61/333,601, which is titled "Header and Method for ITU G-HNEM" and was filed May 11, 2010, the disclosures of which are hereby incorporated by reference herein in their entirety.

TECHNICAL FIELD

Embodiments are directed, in general, to power line communication systems and, more specifically, to an interleaver and a header structure for power line communications.

BACKGROUND

The International Telecommunication Union (ITU) Telecommunication Standardization Bureau is developing new standards—identified as G.hnem—to enable cost-effective smart grid applications such as distribution automation, smart meters, smart appliances and advanced recharging systems for electrIc vehicles. The G.hnem standards link electrIcal grids and communications networks, enabling utilities to exercise a higher level of monitoring and to support power lines as a communications medium. The G.hnem standard supports Ethernet, IPv4 and IPv6 protocols, and G.hnem-based networks can be integrated with IP-based networks. The G.hnem standards define the physical layer and the data link layer for narrowband OFDM power line communications over alternating current and direct current electrIc power lines at frequencies below 500 kHz.

The format of the PHY frame and the interleaver that will be used in the G.hnem standards are being considered by the ITU.

SUMMARY OF THE INVENTION

In one embodiment, a transmitter comprises a scrambler circuit for receiving PHY frames for transmission. The PHY frames comprise a common header segment and a data segment. The data segment further comprises an embedded header segment and a payload segment. A header encoder circuit is coupled to the scrambling circuit and provides forward error correction encoding to the common header segment of the PHY frames. A payload encoder circuit is coupled to the scrambling circuit and provides forward error correction encoding to the data segment including the embedded header segment.

The header encoder circuit may encode the common header segment using a more robust modulation and coding scheme than used by the payload encoder circuit to encode the data segment including the embedded header. The header encoder circuit may encode the common header segment using a maximum available Reed-Solomon codeword size. The common header segment may include data identifying the modulation and coding scheme used to encode the data segment and/or identifying the length of the payload segment. The embedded header segment and the payload portion may be encoded using the same modulation and coding scheme. The embedded header segment may include a separate cyclic redundancy check.

In another embodiment, a transmitter for a powerline communications network comprises a forward error correction (FEC) encoder receiving payload data and appending parIty-check data to the payload data to create a FEC bit stream output. An aggregation and fragmentation module receives the FEC bit stream and segments the FEC bit stream into a plurality of blocks. An interleaving module interleaves the data in the plurality of blocks.

A fragment repetition encoder is coupled to the aggregation and fragmentation module and receives the plurality of blocks. The fragment repetition encoder copies the plurality of blocks a selected number of times and provides the plurality of blocks and copies of the plurality of blocks to the interleaving module. The interleaving module may interleave each block and each copy of the blocks separately, or may interleave each block and all copies of the block together.

The fragment repetition encoder may combine each block and copies of each block in a buffer and pad the buffer with additional bits so that the buffer is equivalent to an integer number of symbols for transmission. The additional bits may be cyclically repeated bits from the buffer.

The length of each block may be selected based upon the number of modulated bits transmitted in one half-cycle of the power carrier on the powerline network, or the total number of input bits in a FEC codeword block, or the total number of bits loaded on symbols that span at least 10 ms for a 50 Hz AC powerline communications network, and at least 8.33 ms for a 60 Hz AC powerline communications network or for a network with no AC signal, or a maximum fragment size of 3072 bits.

A transmitter in one embodiment comprises a header generation circuit that provides a set of common header bits and a set of embedded header bits. A header encoder circuit includes a forward error correction encoder. The header encoder circuit provides a common header segment using the common header bits. A payload encoder circuit includes a forward error correction encoder. The payload encoder circuit provides a data segment that includes an embedded header segment generated from the set of embedded header bits. The data segment may further include a set of embedded payload bits.

BRIEF DESCRIPTION OF THE DRAWINGS

Figure 1:
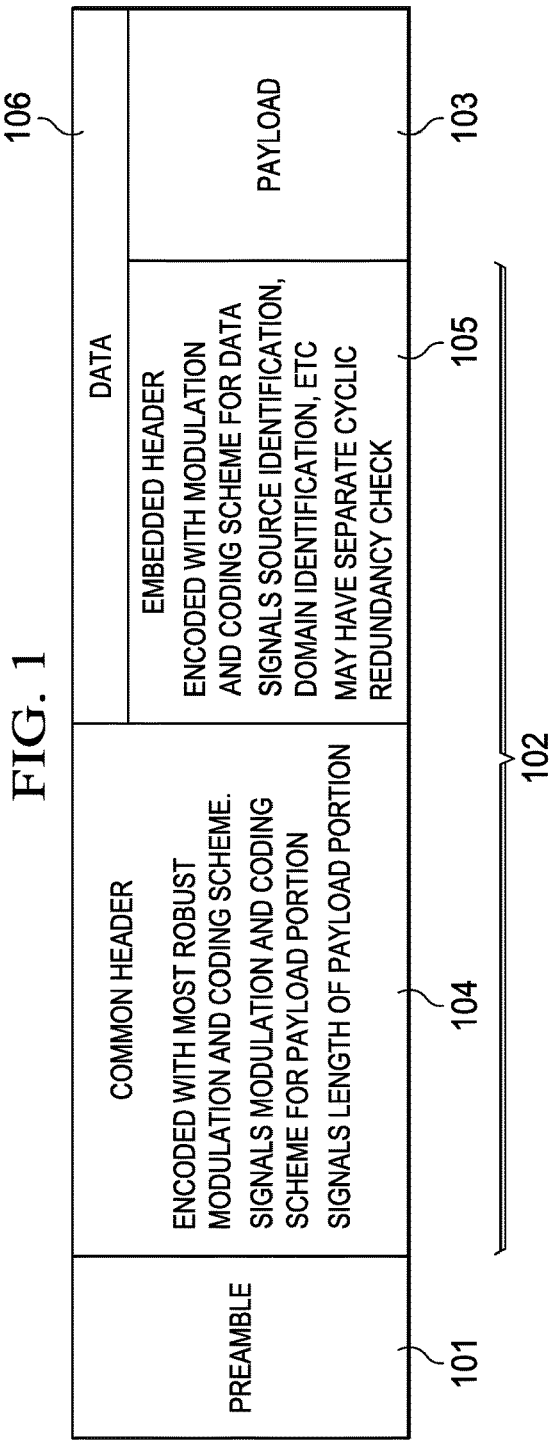
Figure 2:
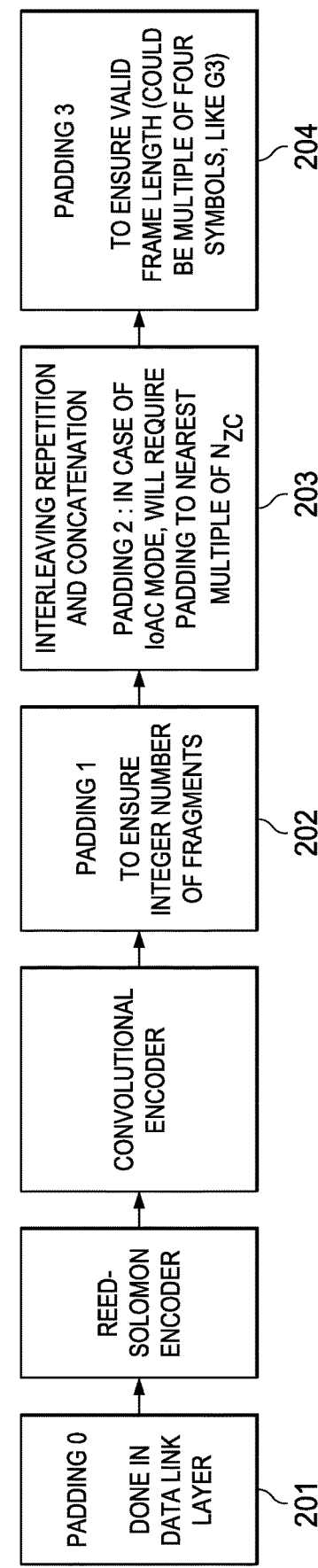
Figure 3:
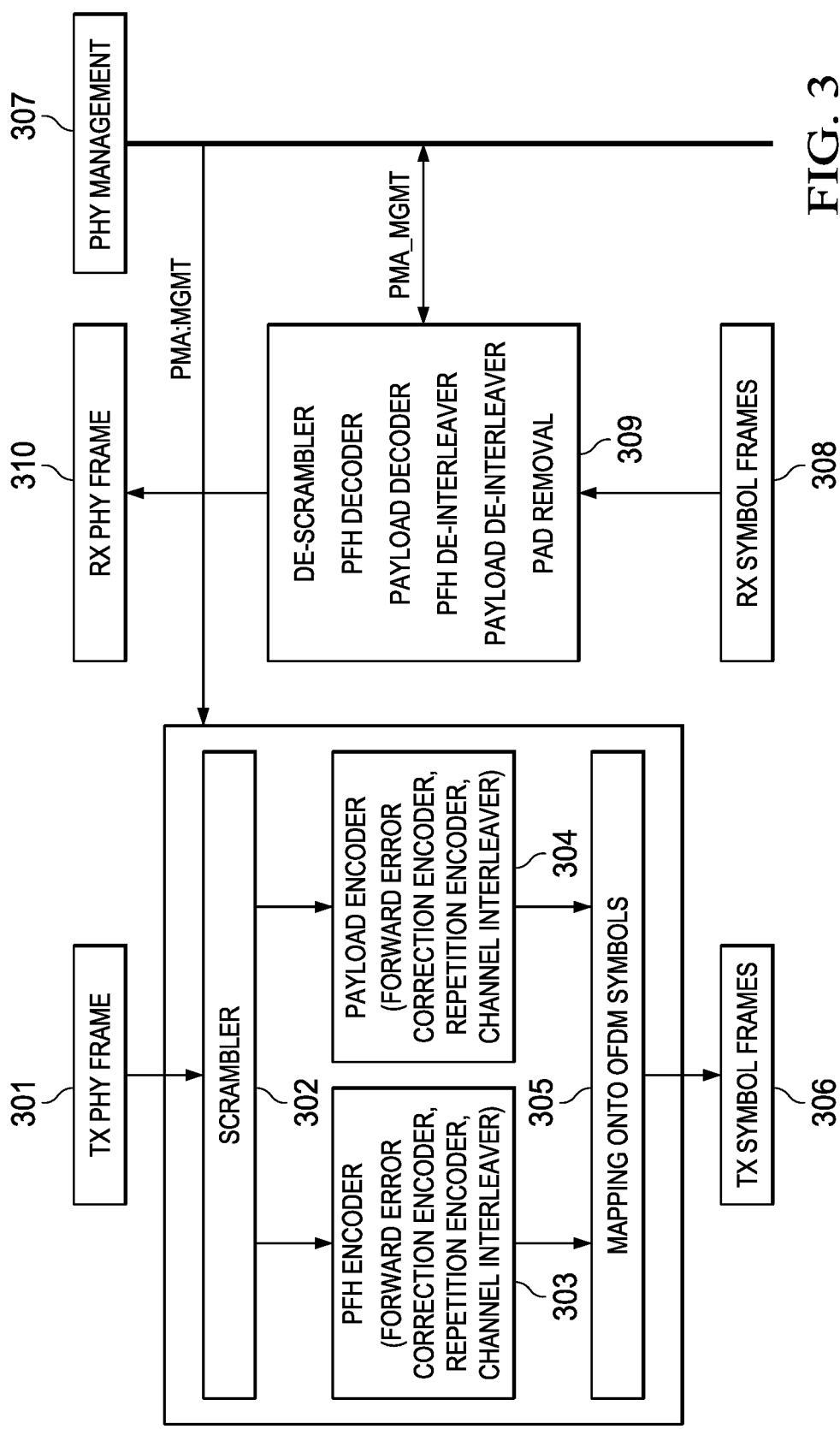
Figure 4:
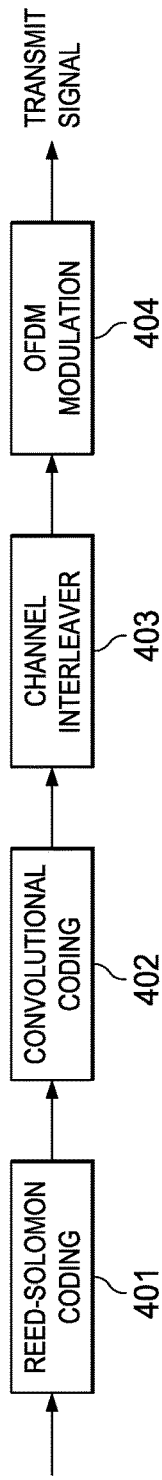
Figure 7:
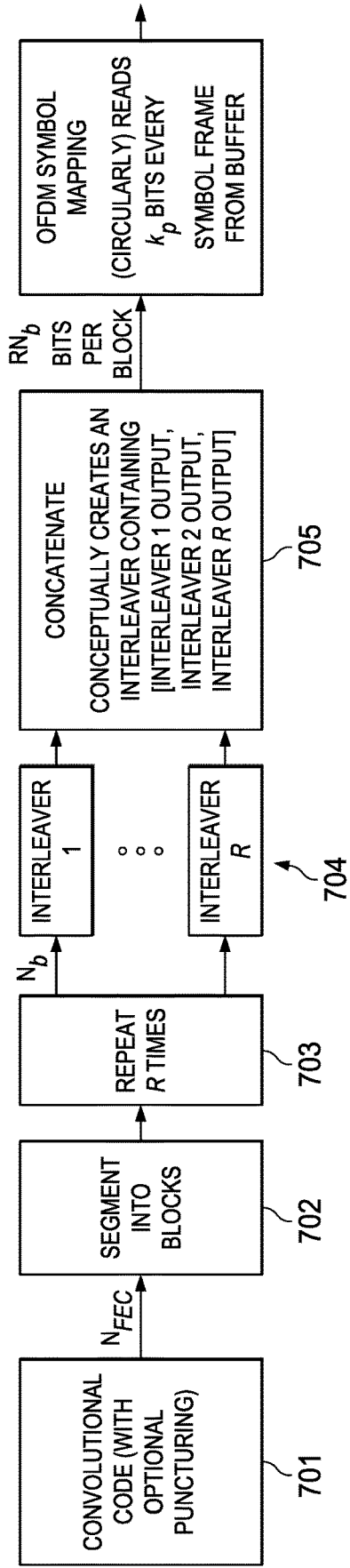
Figure 5:
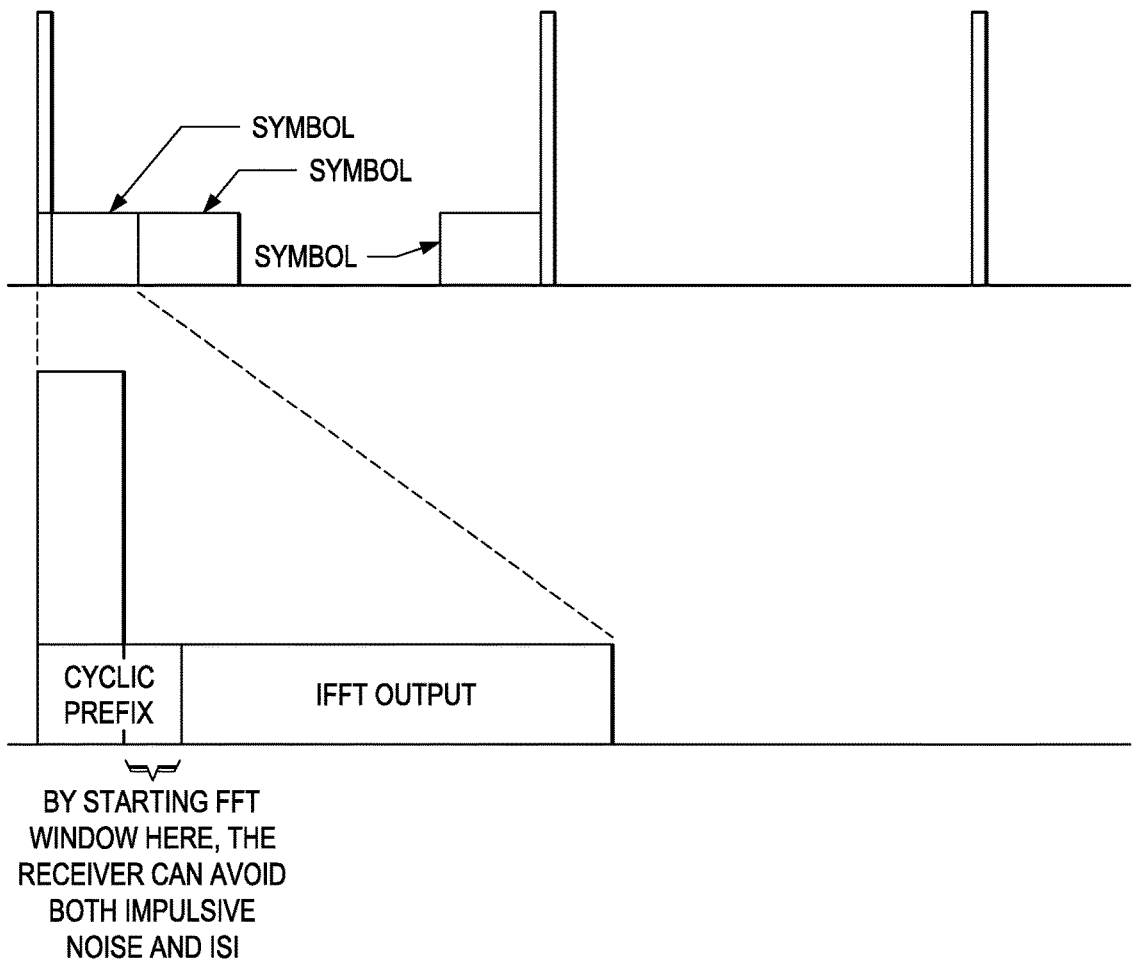
Figure 6:
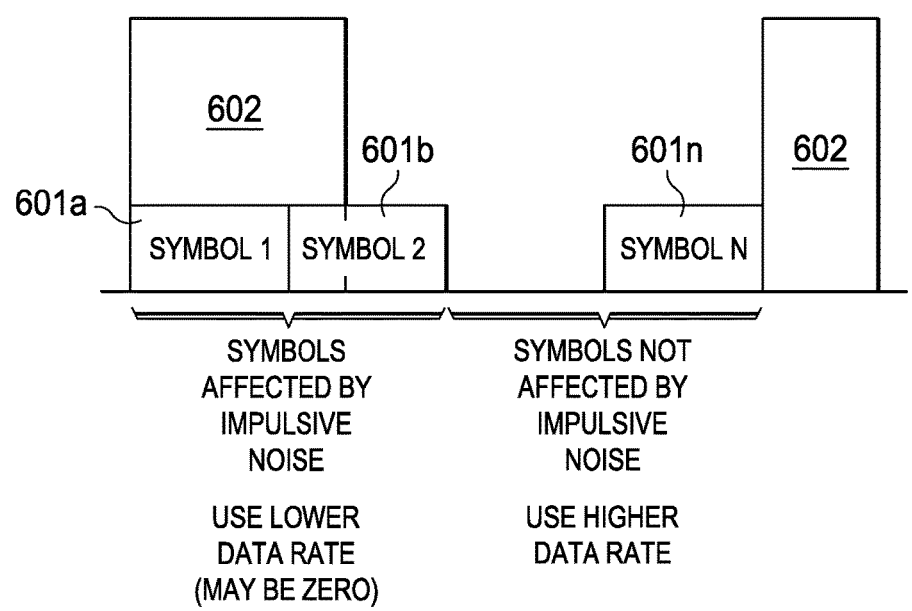
Figure 8:
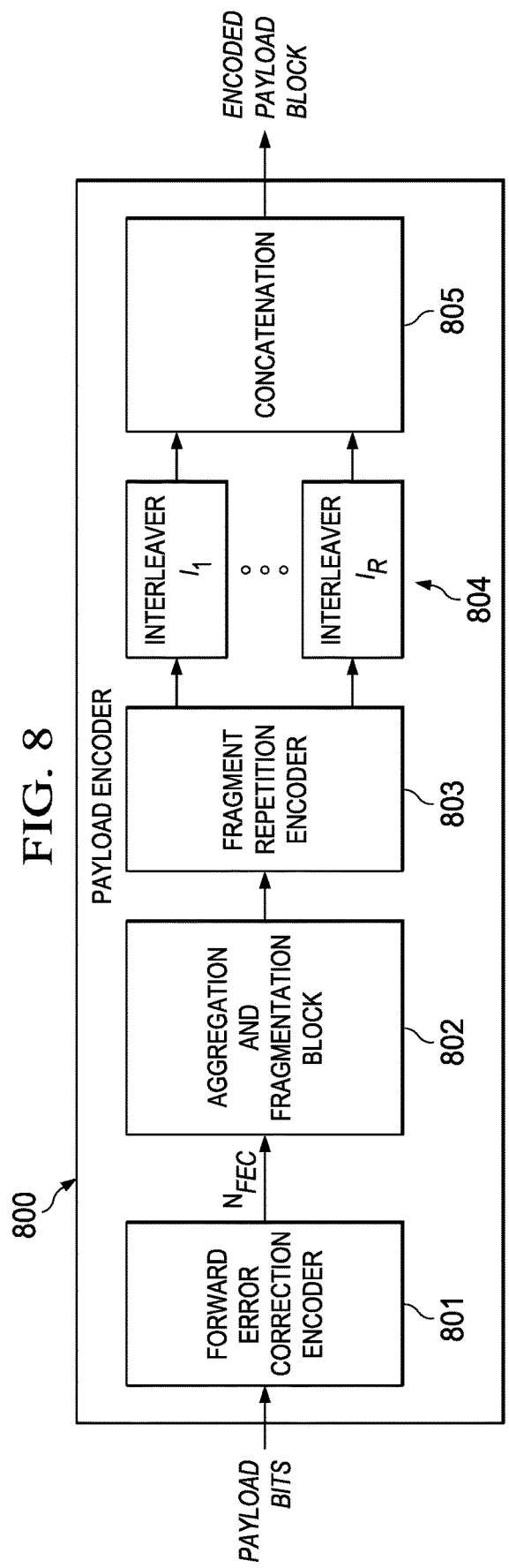

Having thus described the invention in general terms, reference will now be made to the accompanying drawings, wherein:

FIG. 1 illustrates a G.hnem PHY frame;

FIG. 2 illustrates where padding is used in the signal chain;

FIG. 3 illustrates a functional model of a physical medium attachment sublayer according to one embodiment;

FIG. 4 is a block diagram of a system in accordance with one embodiment;

FIG. 5 illustrates synchronizing a cyclic prefix with short impulsive noise bursts;

FIG. 6 illustrates time-domain link adaptation;

FIG. 7 illustrates an interleaver structure according to one embodiment;

FIG. 8 illustrates a functional model of a payload encoder according to one embodiment;

FIG. 9 illustrates the steps performed in the generation of an encoded payload block;

FIG. 10 illustrates the interleaving process according to one embodiment;

FIG. 11 illustrates the order of writing and reading into a permutation matrix according to one embodiment; and FIG. 12 is an example of row-column permutation that displays the spreading behavior of the interleaver.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a G.hnem PHY frame 100, which contains a preamble segment 101, a header segment 102 and a segment payload 103. The preamble 101 enables packet detection. The header 102 enables the receiver to determine information needed for packet decoding. The header 102 can be into two parts: a common header 104 that is transmitted with a fixed modulation and coding scheme, and an embedded header 105 that is transmitted with the same modulation and coding scheme as the payload data 103. The embedded header 105 may have a variable length depending upon the frame type. The embedded header 105 and the payload 103 form a data segment 106 in the PHY frame.

Proposals for the format and contents of the PHY frame header (PFH) to be used in the ITU-T G.hnem standard are under consideration. For example, Tables 1 and 2 list the header fields in two proposals. The proposals include some initial values for the contents of the G.hnem header and the number of symbols. Of particular concern is the fact that even with optimistic assumptions about the header transmission rate (spectral efficiency of 0.5), a large number of header symbols are needed for the Cenelec bands, resulting in high overhead. The large overhead is primarily because of the header size. The common portion of the header field totals 42 bits —with additional bits possible for different frame types. Since the header needs to be transmitted with the most robust modulation and coding scheme (MCS), it is desirable to minimize the number of bits transmitted in the header to limit the overhead.

TABLE 1

| FIELD | NUMBER OF BITS | DESCRIPTION | |
|---|---|---|---|
| FT | 4 | Frame type | Common part |
| DOD | 4 | Domain ID (identifier) | |
| SID | 8 | The DEVICE_ID of the source node | |
| DID | 8 | The DEVICE_ID, MULTICAST_ID or BROADCAST_ID of the destination node(s) | |
| MI | 1 | Multicast indication identifies whether the DID is a unicast or multicast destination | |
| DRI | 1 | Duration indication - indicates whether the frame duration field is present | |
| FTSF | TBD | Frame-type specific field | Variable part |
| HCS | 16 | Header check sequence (16 bits) | Common part |

TABLE 2

| FIELD | NUMBER OF BITS | DESCRIPTION |
|---|---|---|
| MPDU Length | 7 | Indicates the length of the frame payload expressed in bytes at different scales depending on the length of the MAC protocol data unit (MPDU). |
| Transmission Parameters (CM + TM + RS code word size) | 14+ (variable) | Indicates the set of parameters used to transmit the payload. |
| Ack Req | 1 | Indicates whether the receiver should respond with an acknowledgement to indicate MPDU reception status |
| Op Code | 4 | Indicates the encoding method of the remaining bits reserved by ITU in the PFH. |
| Reserved bits for upper layer use | variable | Reserved bits for future use by ITU. |

TABLE 3

| FIELD | NUMBER OF BITS | DESCRIPTION | |
|---|---|---|---|
| FT | 2 | Frame Type | Common fields |
| HCS | 12 | Header Check Sequence | |

TABLE 3-continued

| FIELD | NUMBER OF BITS | | DESCRIPTION | |
|---|---|---|---|---|
| | Sub-total: | | | |
| | 14 | | | |
| TM | 9 - Cenelec | Tone Map | | Variable fields |
| | 40 - FCC | | | |
| FL | 6 | Frame Length | | |
| TX profile | 6 | | | |
| ACK | 3 | Acknowledgement | | |
| FEC size | 8 | Forward Error Correction size | | |
| | Sub-total: | | | |
| | 32 - Cenelec | | | |
| | 63 - FCC | | | |
| Reserved | 0 - Cenelec | Variable field | | |
| | 3 - FCC | | | |
| | Total: | | | |
| | 46 - Cenelec | | | |
| | 80 - FCC | | | |

Embodiments disclosed herein provide methods for more efficient header transmission, which includes both optimizing the bits contained in the header, and the modulation scheme for the header.

Header Organization

To minimize the header overhead, the header is split in two parts: a common header portion (104) and a payload-embedded portion (105). The common part 104 is transmitted with the most robust modulation and coding scheme (MCS) and the embedded portion (105) is transmitted with the same MCS as the payload data. The common part 104 signals the MCS used for the payload. The common part 104 also signals the length of the payload portion. The embedded portion 105 may be embedded with separate cyclic redundancy check (CRC) in the payload. The embedded portion also signals the source ID and domain ID.

The contents of the common header 104 in are shown in Table 4 for one embodiment. Note that it only contains information necessary for the common header to receive the data portion: namely the modulation & coding scheme, the bit loading map, and the length of the data.

TABLE 4

| FIELD | NUMBER OF BITS | DESCRIPTION |
|---|---|---|
| MCS | 4 | Modulation & coding scheme for data |
| Packet Type | 0-3 | Indicates packet type |
| LEN | 6-8 | Length of the payload in symbols |
| LEN_EMBHDR | 0-3 | Length of the embedded header (if necessary) |
| BITLOAD | 0-6 | Bit loading indicator |
| HCS_1 | K | First K bits of 16-bit header checksum, XOR-ed with K-bit destination ID or broadcast group ID (Only an intended device passes this portion of the CRC) |
| HCS_2 | 16-K | Last K bits of 16-bit header checksum (All devices can check this portion of the CRC) |

The following points may be considered in certain embodiments.

The common header (104) may contain an optional length of the embedded header, if there is any variability in the embedded header length. Note that this optional length could be replaced by a packet type, if there is a unique mapping between the packet type and the embedded header length.

The destination ID (or equivalent broadcast group ID) is sent implicitly by masking the first K bits of the CRC. Only the intended receivers pass this portion of the CRC. Other receivers may check the remaining portion of the CRC to ensure that they have received the length parameter correctly, and could use this for Carrier Sense Multiple Access (CSMA) or to save power by going to sleep.

The embedded portion (105) of the header contains other fields, such as those described in Tables 1-4 above, along with a MAC header, if any. A separate CRC may be used for the embedded header (105) to enable receivers to know if they have received the "control" information correctly, even if the actual data is not received correctly.

In another embodiment, the embedded header comprises: a 16-bit source identifier (Source ID); a 16-bit destination identifier (Destination ID); data identifying the number of bits in the payload, which may exclude padding bits; other segmentation information; a 16-bit CRC; and ACK/NAK control. If the embedded header is coded separately from the payload data, then it may be possible to also add optional power control information in the embedded header to further improve the performance of data decoding.

Header Fields

In addition to the organization of the header as discussed above, the choice of the header fields for various embodiments is discussed below.

MCS: In one embodiment, the total possible combinations of modulation and coding scheme (including repetitions) are restricted to twelve or less for all subbands. This leaves room for four reserved values, with sixteen combinations of modulation and coding scheme.

LEN: The length field signals the number of OFDM symbols used. It will be understood that the actual signaled value may be a multiple of a basic quantum. In addition, the embedded portion of the header may signal the number of padding bits for the payload.

LEN_EMBHDR: The length of the embedded header may be restricted to a few combinations. In one embodiment, the value is limited to four combinations.

BITLOAD: The bit-loading parameter signals the modulation scheme used on all tones. In one embodiment, the available bandwidth may be divided into subbands. The numbers of tones in the Cenelec A, B, C and D bands are 36, 20, 6 and 6, respectively, in one embodiment. On the other hand, for the FCC bands, the numbers of tones may be, for example, 143, 34, or 106. Considering the wide disparity in the number of tones, a different number of BITLOAD bits may be used for different bands. Table 5 summarizes the suggested subband size and the number of bits used for signaling the bit-loading for each band option.

TABLE 5

| BAND | CARRIER SPACING | SUBBAND SIZE (NO. TONES/ BW IN KHZ) | NO. OF BITS IN BITLOAD |
|---|---|---|---|
| Cenelec-A | 24.4140625/16 | 4/6.1035 kHz | 3 |
| Cenelec-B | | | 2 |
| Cenelec-C | | | 2 |
| Cenelec-D | | | 2 |
| FCC/ARIB | 24.4140625/8 | 4/24.414 kHz | 4-5 |

Length Indication

The main uncertainty in the length comes from padding in the signal chain. This is done in several places, as shown in FIG. 2, which is illustrative of padding used in the signal chain. Padding 0 (201) represents padding of the MPDU that may occur in the data link layer (DLL) before encoding. After passing through a Reed-Solomon (RS) encoder and convolutional encoder, which provide FEC, padding 1 (202) may occur to ensure an integer number of fragments prior to interleaving. Padding 2 (203) may occur during interleaving, repetition and concatenation. Finally, padding 3 (204) ensures that a valid frame length is processed.

From the frame duration, the receiver only knows the total number of bits at the end of the processing chain. It is necessary to define some method to ensure the receiver can obtain the other parameters. Two methods have been proposed to handle this.

In G3, padding 2 and 3 are not performed. The specification does not explicitly state how padding 0 and 1 are performed, but in one embodiment padding 0 (201) is done to ensure that the number of bits in padding 3 (204) is minimized, given the total number of bits to be transmitted. With this assumption, the receiver can uniquely process the received bits up till the Reed-Solomon decoder. After that point, DLL signaling gives the number of bytes added in the padding 0 (201) stage.

This method would work adequately for G.hnem, except for the Interleave-over-AC-cycle (IoAC) mode in which case the padding 2 (203) could add an unpredictable number of bits. To combat this, the following method has been suggested.

RestrIct the payload size (i.e. the number of bytes at the input to the RS encoder) to a pre-determined set, and signal the index within this set. In this method, padding 0 (201) is performed to achieve a target size at the RS encoder input, which is then signaled in the PFH. This allows the receiver to do the RS decoding, after which DLL signaling gives the number of bytes added in the padding 0 block, just as in G3. This method has the disadvantage of restricting the RS input size, and increasing the signaling required in PFH.

An alternative method described below builds on both the above methods.

High Level DescrIption of Suggested Signaling Method

In this method, the main idea is to do most of the padding in the DLL (padding 0, 201) as is done in G3. Padding 0 (201) adds an integer number of bytes before segmentation into LCDUs. The number of bytes padded is indicated in DLL signaling. LCDU segmentation ensures roughly equal Reed Solomon codeword lengths, subject to a constraint on the maximum LCDU length. By controlling the maximum LCDU length, the transmitter can adapt to channel conditions. Given the maximum LCDU length $K_{max}$, the actual codeword length is some number between $K_{max}/2$ and $K_{max}$ depending on the input MPDU length.

Padding 1 (202) adds very few bits —fewer than can be generated by 1 byte at the convolutional encoder input. Thus, the maximum length of padding 1 (202) is 15 bits (corresponding to rate-1/2 code). Since this rule is known a priorI, the number of padding 1 (202) bits is not signaled, but is inferred by the receiver. The values in padding 0 (201) and padding 1 (202) ensure that an integer number of interleaver fragments are produced, while adding the fewest number of pad bits.

Padding 2 (203) is only done for IoAC mode. Note that for each interleaver fragment, padding 2 (203) always adds the same number of OFDM symbols, in order to ensure that each interleaver fragment spans roughly an integer number of OFDM symbols. Note further the number of OFDM symbols added for each fragment is at most equal 14 for Cenelec bands and 28 for FCC band. Consequently, padding 2 (203) can be signaled with 4 bits for Cenelec band and 5 bits for FCC band.

Padding 3 (204) is only done to ensure a valid number of OFDM symbols. Assuming this is a multiple of four, then two bits are needed to signal it. Note that padding 3 (204) should not be used in IoAC mode because the aim is to spread each frame over an integer number of zero crossings.

Table 6 lists fields used in one embodiment.

TABLE 6

| FIELD | NUMBER OF BITS | NOTE |
|---|---|---|
| FT | 1 | Common fields |
| HCS | 12 | |
| BAT type | 1, indicates run-time Bit Allocation Table (BAT) or not | Variable fields |
| TM | 9 - Cenelec 40 - FCC If run-time BAT is not used, each bit indicates whether or not a group is used. If nan-time BAT is used, these fields indicate BAT id | |
| FL | 9 - Cenelec 10 - FCC In IoF mode, gives the number of symbols in the payload. In IoAC mode, gives the number of zero crossings, and the number of pad symbols used for each fragment during interleaving | |
| Coding & modulation | 5 (also indicates interleaver type) | |
| ACK | 1 | |
| Maximum RS codeword (LCDU) length | 2 | |
| Reserved | 2 - Cenelec 8 - FCC | |
| Total | 42 - Cenelec 80 - FCC | |

Operation at the Transmitter
DLL Padding

The transmitter receives an MPDU size of $N_{MPDU\text{-}IN}$ bytes and decides on a maximum LCDU codeword size $K_{max}$, which may be one 4 values in one embodiment (such as 239, 136, 88, and 42, for example). The transmitter goes through the following calculations.

First-cut MPDU division into LPDUs, and corresponding number of coded bits: The number of codewords (LCDUs) is $N_{CWnom}=\text{ceil}(N_{MPDU-IN}/K_{max})$. If each RS codeword adds $R_{CW}$ bytes of parIty (it is the same for all codewords, since their sizes are approximate the same), then the total number of bytes at the Reed Solomon output is $N_{RSOUTnom}=N_{MPDU-IN}+N_{CWnom}*R_{CW}$ bytes. This produces $N_{FECB}=(N_{RSOUT}*8+6)! \, r_I$ bits at the convolutional encoder output.

Adjust number of Reed Solomon output bytes: The number of pad bits (BP) is calculated, namely as $B_P=B_0 \times N_{frg}-N_{FECB}$. These are the number of pad bits that would have been needed, if there were no padding in the DLL. Instead, DLL padding is done so that $0<; B_P<8/rI$. More precisely, the desired RS output size is $N_{RSOUTadj}=\text{floor}((B_0 \times N_{frg}*r_I-6)/8)$. Note that with this number of RS bytes, $B_P$ is always less than $8/r_I$ as required.

Adjust number of codewords, MPDU size: The actual number of codewords is adjusted to $N_{CW}=\text{ceil}(N_{RSOUTadj}/(K_{max}+R_{CW}))$. The adjusted MPDU size is $N_{MPDUadj}=N_{RSOUTadj}-N_{CW}*R_{CW}$. This is the number of input bytes at the Reed Solomon codeword in order to get an output of $N_{RSOUTadj}$ bytes.

DLL padding: The number of DLL padding bytes is $N_{PAD-DLL}=N_{MPDUadj}-N_{MPDU-IN}$ bytes. These padding bytes are added at the DLL. They could contain all zeros, or maybe cyclic repeats.

Division into codewords: The padding input is divided into $N_{CW}$ LCDUs of size $K_{CW1}=\text{ceil}(N_{MPDUadj}/N_{CW})$ each, except the last $(N_{CW}*K_{CW1}-N_{MPDUadj})$ codewords which have size $K_{CW1}-1$ bytes.

At the end of the above process, the input has been padded to ensure the number of padding 1 (202) bits is always less than $8/r_I$, and the padded MPDU is divided into roughly equal sized LCDUs under the constraint of the maximum codeword length $K_{max}$.

PHY Padding

The transmitter performs the padding as mentioned above, divides the padded MPDU into LCDUs, and performs forward error correction (FEC). The transmitter than calculates $B_P$ padding bits, and does interleaver fragmentation, etc. In Interleave-over-fragment (IoF) mode, no further padding is needed.

In IoAC mode, one further stage of padding is needed. With R repetitions, only $B_0*R$ bits are generated by the interleaver. The output, on the other hand, contains ceil$(B_0*R/N_{ZC})*N_{ZC}$ bits. Thus, a difference of Pad2=ceil$(B_0*R/N_{ZC})*N_{ZC}-B_0*R$ bits, or equivalently Pad3/$k_P$ OFDM symbols is added. This number of padded OFDM symbols may be signaled, given by $N_{pad2-IoAC}=(\text{ceil}(B_0*R/N_{ZC})*N_{ZC}-B_0*R)/k_P$ in the FL field for the IoAC mode.

In addition, to the above padding 3 (204) may be done to get to a desired frame length. If this is done, the value should be signaled.

Summary of Signaling

DLL: Number of pad bytes given by $N_{PAD-DLL}=N_{MPDUadj}-N_{MPDU-IN}$ bytes.

PHY:
1. Maximum codeword size: $K_{max}$. Suggested length=2 bits
2. FL
   a. IoF mode: Number of symbols in frame: 9 bits for Cenelec, 10 bits for FCC band.
   b. IoAC mode:
      i. Number of zero crossing cycles: 5 bits for Cenelec, 5 bits for FCC band.
      ii. Number of symbols in Pad2: $N_{pad2-IoAC}=(\text{ceil}(B_0*R/N_{ZC})*N_{ZC}-B_0*R)/k_P$. 4 bits for Cenelec, 5 bits for FCC band.

Receiver Operation

IoF mode: $B_{tot}=k_P*FL/R$ is the total number of bits before repetitions. $B_0$ is the maximum divisor of $B_{tot}$ that is less than or equal to $\min(B_{tot}, N_{ZC}, B_{max})$.

IoAC mode: In IoAC mode, the effective frame length is the total frame length (some multiple of the number of symbols corresponding to $N_{ZC}$ bits) minus the number of symbols added in pad 2. (Note that the latter is signaled). With this number, the receiver again calculates:

$B_{tot}=k_P*FL_{eff}/R$ as the total number of bits before repetition and padding by $N_{pad2}$ bits.

$B_0$ is the maximum divisor of $B_{tot}$ that is less than or equal to $\min(B_{tot}, N_{ZC}, B_{max})$.

Once $B_0$ is known, deinterleaving is done. The number of pad bits in pad 1 stage is estimated as $B_P=\text{mod}(B_{tot}, 8/r_I)$. These pad bits are removed before decoding. The DLL contains the number of pad bytes added in stage 0.

Run-Time BAT Signaling

While run-time BATs (bit allocation tables) are supported in the ITU specification, there is currently no way for the receiver to determine which run-time BAT was used. In order to know this, the receiver has to know at least (i) the transmitter ID, and (ii) the BAT index.

In one embodiment, a flag may be used to indicate whether the BAT is a pre-determined BAT or a runtime BAT. If the pre-determined BAT is used, the tone map field indicates which tone groups are active, as proposed currently. If the runtime BAT is used, the tone map field carries the transmitter (16-bit) ID, the domain (16-bit short) ID and the BAT index. Since these require at least 36 bits, this is done only for FCC band.

For Cenelec band, run-time BAT can only be used with constraints (if at all) since the TM field is not large enough to hold the transmitter and domain ids. One possible constraint is to restrict run-time BATs in Cenelec band so that for a given receiver, the same BAT table is used for all transmitters. Thus, just from the BAT index, the receiver can determine the run-time BAT.

Physical Medium Attachment sub-layer (PMA)

FIG. 3 illustrates a functional model of the PMA according to one embodiment. In the transmit direction, an incoming PHY frame (301) comprises a header (PFH) and payload, such as the PHY frame illustrated in FIG. 1. The PFH may comprise a common part of the header, while the payload may include a variable or embedded portion of the header. Both the PFH bits and the payload bits of the incoming frame are scrambled in scrambler 302. The PFH bits of the incoming frame are encoded in PFH encoder 303, which includes a FEC encoder, repetition encoder and channel interleaver. The payload bits are separately encoded in payload encoder 304, which also includes a FEC encoder, repetition encoder and channel interleaver. The PFH and payload encoders 303, 304 may be the signal chain illustrated in FIG. 2, in one embodiment. The parameters of payload encoder 304 are controlled by the PHY management entity 307, which provides PMA_MGMT primitives. The parameters of the PFH encoder are predefined for each particular bandplan to facilitate interoperability. After encoding, the PFH and payload are each mapped 305 into an integer number of symbol frames. The obtained symbol frames (306) of the PFH and the payload are submitted to a physical medium dependent sub-layer for modulation and transmission over the medium.

In the receive direction, all necessary inverse operations of decoding, and de-scrambling (309) are performed on the received symbol frames (308). The recovered PFH and payload are combined in received PHY frames (310) are further processing in a physical coding sub-layer.

Based on simulations in the Cenelec-A band, it has been agreed to use a bit interleaver spanning a half mains cycle. The bit interleaver is positioned between the FEC and the complex modulation. In extending to the FCC band, concerns were raised regarding the memory required by an interleaver with the same time span. On the other hand, for the Cenelec B band, it was pointed out that the interleaver may span too few bits for the lowest spectral efficiency.

Different interference scenarios may be used for evaluation of the different schemes considered for ITU G.hnem. The noise models to be considered for the simulations include white noise only, white noise+time domain periodic noise, and white noise+time domain periodic noise+frequency domain narrowband interference. Two key factors of an interleaver design are (1) the size of the interleaver, implying the time period that the interleaver spans, and (2) the complexity of implementing the de-interleaver. An interleaver with a longer time span is expected to spread out impulsive noises. However, an interleaver spanning a longer period in time, implies that the receiver has to do the de-interleaving operation fast enough to meet any latency requirements for acknowledgement of the reception of the packet. Thus, the interleaver length needs to be carefully chosen to achieve a tradeoff between performance and complexity. In one embodiment, the interleaver length is chosen to span the period between the zero crossings of the AC mains.

Two scenarios are considered, one with a longer interleaver and another with a shorter interleaver whose interleaver length is related to the periodicity of the time domain periodic noise. The simulation parameters are given in Table 7.

TABLE 7

| SIMULATION PARAMETER | VALUE |
| --- | --- |
| Modulation | DBPSK |
| Bandwidth occupied | 40-90 kHz |
| Impulse noise period | Various combinations: 11.12 ms, 8.33 ms, 10 ms |

TABLE 7-continued

| SIMULATION PARAMETER | VALUE |
| --- | --- |
| Impulse noise length | 2 ms |
| Interleaver size | Short & full-packet |
| Coding | Rate ½, K = 7 Convolutional code + Reed Solomon |

FIG. 4 is a block diagram of a system in accordance with one embodiment. Forward error correction is provided by Reed Solomon coding 401 and convolutional coding 402. Channel interleaver 403 is 11.12 ms long in one scenario, and 77.84 ms long in another scenario. The output of channel interleaver is provided to ODFM modulation 404. The periodicity of the periodic impulse noise is 11.12 ms. Based on observed results from a set of simulation results for the case when the impulse noise period is 11.12 ms (an integer number of OFDM symbols), the longer interleaver offers minimal gains at the cost of increased memory and processing requirements.

Benefits of Tying Interleaver Length to AC Mains

The results noted above establish that choosing an interleaver having a length that is close to the AC mains suffices to achieve most of the interleaving gains for the case of periodic impulsive noise. Based on this, the interleaver length for the Cenelec-A band has been chosen to be an integer number of OFDM symbols, whose span does not exceed 10 ms.

In one embodiment, the symbol length is also chosen to be equal (or very close) to a divisor of the zero crossing duration. In other words, given the symbol period $T_{sym}$, the zero crossing period $T_{zc}$ can be expressed as $T_{sym}*N_{sym}+T_{rem}$, where $0<T_{rem}<T_{sym}$. In one embodiment, $T_{sym}$ is chosen so that $T_{rem}$ is close to zero. The following potential benefits result from selecting $T_{sym}$ in this manner:

A first minor benefit is that such a choice gives the maximum possible interleaver length, under the assumption that the interleaver length is $T_{sym}*N_{sym}$, which is clearly maximized by choosing $T_{rem}$ close to zero. Other choices, with a larger $T_{rem}$, have poorer performance due to shorter interleaver length, with the degradation being visible above $T_{rem} \sim 0.5$ ms.

A second benefit of choosing $T_{rem}\sim0$ is that it enables the system to combat short bursts of periodic impulsive noise. To be precise, consider the case where the periodic impulsive noise occurs during every zero crossing, and is less than one cyclic prefix in length (i.e., a few 10s of microseconds). This case is observed quite frequently, in practice. If there are an integer number of OFDM symbols between successive impulsive noise bursts (i.e., between zero crossings of the mains), it is possible to synchronize the cyclic prefix of one symbol with the impulsive noise burst. Thus, the OFDM system becomes completely immune to the effect of impulsive noise.

FIG. 5 illustrates synchronizing a cyclic prefix with short impulsive noise bursts. Note that this is not possible unless there are an (nearly) integer number of OFDM symbols between impulse noise bursts. Even if one impulse noise burst is synchronized with the cyclic prefix, subsequent bursts will drift into the FFT symbol.

Note that achieving the above requires the transmitter to align the start of some OFDM symbol with the zero crossing. This imposes a granularity of one OFDM symbol length (<1 ms) in the medium access procedure. Note that the preamble typically lasts a few OFDM symbols, and so the additional granularity is small compared to the delay requirements from accurate channel sensing.

Advantages: The above method works without any additional signaling. Further, since the preamble can only start at discrete intervals, the receiver can use this information to reduce the probability of false preamble detections.

Disadvantages: The above method, by itself, is effective only when the impulsive noise burst length is of the order of the cyclic prefix duration. Further, unless the number of symbols per zero crossing mains is a multiple of 3, this does not protect against impulsive noise from all three phases.

For the case of differential PSK, this method provides performance benefits such that synchronized symbols offer about 0.2-0.3 dB gain over unsynchronized symbols. Further gains are expected with coherent modulation.

Time-Domain Link Adaptation

To handle the case where impulsive noise is much longer than the cyclic prefix, the system may use time-domain link adaptation as illustrated in FIG. 6. In every block of N symbols $601a\text{-}n$, a few symbols are affected by impulsive noise 602. With simple receiver feedback, the transmitter can adapt the data rate in different symbols 601 to the signal-to-noise ratio (SNR) in the symbol. For example, no data may be transmitted in the first two symbols $601a$, $602b$, with maximum data rate being transmitted in the remaining (N−2) symbols.

Note that the link adaptation mentioned here is the time-domain equivalent of adapting the modulation parameters on different tones in response to channel variations or narrowband interference. In powerline communication, since periodic impulsive noise is a dominant noise source, time-domain link adaptation would be equally effective and should be combined with frequency domain link adaptation. In the extreme case, the system use a two-dimensional link adaptation for cases where the periodic impulsive noise is also frequency selective and concentrated on a few tones.

The use of time-domain link adaptation only requires receiver feedback of the phase on which it is present, and the SNR profile across different symbols. It does not necessarily require the transmitter to synchronize symbol start with the zero crossing.

A few different variations are possible, based on the general principle of time domain link adaptation. If some symbols have such high noise that they cannot be used, then, (i) dummy data can be transmitted, (ii) only pilots can be transmitted, (iii) neither pilots nor data may be transmitted, (iv) neither pilots nor data may be transmitted and the pilot phase may not count up.

In the transmitter, after optional repetition, the coded bit stream is interleaved 403 before modulation 404 (FIG. 4). To limit decoding latency, interleaving is done over a block of $N_{int}$ or fewer OFDM symbols. The values of $N_{int}$ for different bands is given in Table 8.

TABLE 8

| BAND | FFT SYMBOL DURATION (EXCLUDING CP) | $N_{INT}$ |
|---|---|---|
| Cenelec-A/B/C/D | 655.36 us | 14 |
| FCC | 327.68 us | 28 |

The zero crossing duration (AC mains frequency) may be 50 or 60 Hz. The values in Table 8 were chosen to account for the worst case value zero crossing period of 10 ms. In other embodiments, different profiles may be defined for different regions, with correspondingly different interleaver lengths.

The total number of bits modulated in one OFDM symbol is denoted $B_{sym}=\Sigma k\ Bk$. With $N_{sym}$ symbols per frame, the coded bit stream contains $N_{sym}*B_{sym}$ bits, and is divided into $N_{block}=\lceil N_{sym}/N_{int}\rceil$ blocks, where $\lceil f \rceil$ denotes the smallest integer greater than or equal to f. The first $N_{block}$-1 blocks contain $N_{int}*B_{sym}$ bits, corresponding to $N_{int}$ OFDM symbols. The remaining bits can only fill $N_{remaining}=N_{sym}-(N_{block}-1)*N_{int}$ symbols. To ensure simplicity of implementation and to ensure sufficient interleaving depth for all bits, repetition bits are padded to the last block to extend the length to $N_{int}$-last symbols. This is done by repeating the $N_{remaining}*B_{sym}$ bits circularly till the desired number of bits is obtained. For a given value of $N_{remaining}$, the last block size $N_{int}$-last is drawn from the set $\{N_{int}, \lceil N_{int}/2 \rceil, \lceil N_{int}/4 \rceil\}$.

Given a number of symbols $N_{remaining}$, the choice of $N_{int}$-last from the allowed set needs to be determined. One possibility is to adaptively set the size depending on noise conditions. Another is to use a fixed mapping from $N_{remaining}$ to $N_{int}$-last. For example, $N_{int}$-last is the minimum value in the allowed set which is greater than $2*N_{remaining}$. If no such value exists, $N_{int}$-last is equal to $N_{int}$.

Thus, note that the ith block contains coded bits modulating a block of $N_{int}(i)$ successive OFDM symbols, where $N_{int}(i)=N_{int}$ for i=1, 2, . . . , $N_{block}$-1, and $=N_{int\text{-}last}$ for i=$N_{block}$.

In each block, interleaving of bits is done as follows. The input bits are S/P converted to a $B_{sym} \times N_{int}(i)$ matrix by serial-to-parallel conversion, as shown below.

$$\text{Bits}\left(1, 2, \ldots, B^*_{sym}N_{int}(i)\right) \rightarrow \begin{matrix} \text{Bits}(1) & \text{Bits}(B_{sym}+1) & \text{Bits}((N_{int}(i)-1)^*B_{sym}+1) \\ \text{Bits}(2) & \text{Bits}(B_{sym}+2) & \text{Bits}((N_{int}(i)-1)^*B_{sym}+2) \\ \text{Bits}(3) & \text{Bits}(B_{sym}+3) & \ldots & \text{Bits}((N_{int}(i)-1)^*B_{sym}+3) \\ \ldots & \ldots & \ldots \\ \text{Bits}(B_{sym}) & \text{Bits}(2B_{sym}) & \text{Bits}(N_{int}(i)^*B_{sym}) \end{matrix}$$

Then, the matrix is interleaved as follows. The (K, L)th element of the output matrix is determined as the (k, 1)th input element, wherein k=(α*(K−βL)) % $B_{sym}$ l=(γ*(L−δk)) % $N_{int}$(i), and the integers α, β, γ, δ are chosen to ensure gcd(α, $B_{sym}$)=gcd(δ, $B_{sym}$)=gcd(β, $N_{int}$(i))=gcd(γ, $N_{int}$(i))=1.

After interleaving, the blocks are concatenated and the resultant $B_{sym} \times N_{sym}$ matrix is used for modulation.

As long as the interleaver size is matched to the periodicity of the impulse noise, the performance benefit of longer interleavers is minimal. Hence, in one embodiment, the length of the channel interleaver (the interleaver between the channel and the inner code) is limited to the periodicity of the impulse noise.

Interleaver Structure

FIG. 7 illustrates an interleaver structure according to one embodiment.

The convolutional code 701 receives and processes one or more Reed Solomon code words and produces $N_{FEC}$ bits. These bits need to be repeated appropriately, interleaved and fit into an integer number of OFDM symbol frames. Each OFDM symbol frame carries $k_H$ or $k_P$ bits depending on whether the symbol frame goes to the header or to the payload. This is done in the following steps.

The ($N_{FEC}$ bits) input stream is first segmented (702) into B blocks of roughly equal lengths, drawn from a set of valid block lengths. The length of each block is determined as the minimum of: (i) the input number of bits $N_{FEC}$, (ii) 2048 (or some other number) bits, and (iii) the number of bits transmitted in one semi-zero crossing interval (either 8.33 ms or 10 ms depending on the region).

Some example combinations of the above-identified parameters are given in

TABLE 9

| $N_{FEC}$ | No. of tones per OFDM symbols | Average no. of bits per modulated carrier | $k_P$ (Column 2* Column 3) | No. of OFDM symbols in half-zero-crossing period | No. of modulated bits in half-zero-crossing period (Column 4* Column 5) | Desired block length Minimum of (2048, Column 1, Column 6) |
|---|---|---|---|---|---|---|
| <1008 | 36 (Cenelec-A) | 2 (QPSK) | 72 | 14 (10 ms) | 1008 | $N_{FEC}$ |
| ≥1008 | | | | | | 1008 |
| <2016 | 36 (Cenelec-A) | 4 (16-QAM) | 72 | 14 (10 ms) | 2016 | $N_{FEC}$ |
| ≥2016 | | | | | | 2016 |
| <2048 | 144 (FCC band) | 2 (QPSK) | 288 | 24 (8.33 ms) | 6912 | $N_{FEC}$ |
| ≥2048 | | | | | | 2048 |

Each block is repeated R times (703) and applied to R interleavers (704). R is the number of repetitions, and R may be 1, 2, 4 or 8, for example.

Each interleaver (704) produces B bits. The output of the interleavers (704) is concatenated (705) to yield a buffer of length RB interleaved bits. The output of the buffer is read to yield the desired $k_P$ modulated bits for each OFDM symbol. When a buffer is exhausted, the buffer for the next block is created and used. If the last buffer is exhausted before the frame has been modulated, the last buffer is read again from the beginning.

Interleaving Depth

For the case of one repetition, the interleaving depth is limited to the half-zero crossing period. This is ensured by the condition that the maximum block length is the number of modulated bits in half mains cycle period. There are two exceptions to this pattern:

1) If the number of repeats is larger than 1, the same coded bits can be spread across multiple 10 ms intervals.
2) For the FCC band, the maximum interleaver depth of 2048 bits may span less than the half mains cycle period. Simulation results show that this does not excessively affect performance even when 30% of the band is erased in 20% of the symbols.

Memory Requirement

The interleaver (704) requires memory allotted for only one block at a time. Even if multiple repeats are interleaved, the log-likelihood ratios (LLRs) can be combined in place. In other words, the system only needs to store LLRs at the deinterleaver output. For multiple received blocks, the system only has to find the position where a given bit is deinterleaved, and accumulate the corresponding LLR. Given that the maximum block size is 2048 bits, only 2K bytes of memory is required assuming 8-bit LLRs.

Payload Encoder

FIG. 8 illustrates a functional model of a payload encoder 800 according to one embodiment. The payload encoder 800 comprises FEC encoder 801, an aggregation and fragmentation block (AF) 802, a fragment repetition encoder (FRE) 803, and interleaver 804. FRE 803 supports a robust communication mode (RCM) and is turned off in case of normal mode of operation.

The incoming PHY-frame payload is divided into sequential information blocks of K bytes per block. Each information block is encoded by FEC encoder 801. The bytes in each information block shall be in the same order as they are in the corresponding LPDU. The payload bit to be transmitted first is the first in the corresponding information block.

AF block 802 first collects one or more FEC codewords and forms an FEC codeword block. One or more FEC codewords may make up the FEC codeword block. The FEC codewords may be concatenated into an FEC codeword block in the order they are output by the FEC encoder and with the same order of bits. Further, the FEC codeword block is partitioned into fragments of roughly the same size-$B_0$ bits each.

FRE 803 provides repetitions of fragments with the repetition rate of R. If R>1 is set, each fragment shall be copied R−1 times and all copies concatenated into the fragment buffer, FB, so that the first bit of each copy follows the last bit of previous copy. The total size of the FB is $B_0 \times R$ bits. FRE 803 supports the values R=1, 2, 4, where the value of R=1 corresponds to normal mode of operation. If R=1, an FB contains a single fragment of $B_0$ bits.

All fragments of each FB are interleaved. The first fragment of each FB is interleaved by the interleaver Ii (804). If repetitions are applied, the following copies of fragments in each FB shall be interleaved by interleavers 12, 13, . . . IR (804), respectively. The interleaver $I_r$ is obtained by cyclically shifting Ii by round($B_0(r-1)/R$) bits.

If the number of bits in the fragment $B_0$ doesn't fit integer number of symbols, the fragment shall be padded accordingly prior to the interleaving. The pad shall be generated by repeating the bits of the fragment starting from the first bit of the fragment, in ascending order, until the symbol is filled up.

If the value of $B_0$ is selected to be less than $N_{ZC}$, the payload encoder may be set into Interleaving-over-AC-cycle (IoAC) mode or in Interleaving-over-Fragment (IoF) mode. If set to IoAC mode, each FB (containing interleaved fragments and their interleaved copies) shall be padded to the closest integer number of $N_{ZC}$. The pad shall be generated by cyclical repeating of the bits of this same FB, starting from its first bit. The first bit of the pad shall follow the last bit of the FB and shall be the repetition of the first bit of the same FB. After FB is padded, it's passed for concatenation 805.

If set to IoF mode, the FB shall be passed for concatenation with no additional bits padded (while the length of the FB is less than $N_{ZC}$).

The interleaving mode is set based on the number of symbol frames, k, to be generated ($k_P$ for payload symbol frames and $k_H$ for header symbol frames). If k is an integer multiple of the minimum number of symbols spanning an AC zero crossing period, the IoAC mode is always used. Otherwise, the IoF mode is used.

The FBs shall be concatenated into an encoded payload block, in the order of the sourcing fragments. In Normal mode of operation and IoF mode, the encoded payload block is a concatenation of $N_{frg}$ fragments generated by the AF 802.

The encoded payload block is passed for segmentation into symbol frames.

FIG. 9 illustrates the steps performed in the generation of the encoded payload block for the case $N_{frg}$=4. The AF (802) forms FEC codeword block 901 comprising one or more FEC codewords 902. The FEC codewords 902 are concatenated into an FEC codeword block 901 in the order they are output by the FEC encoder (801) and with the same order of bits.

The value of $B_0$ shall be calculated as a divisor of the total number of bits in the FEC codeword block 901. This shall be the maximum divisor which value is less than or equal to the minimum of:
1) The total number of input bits (the FEC codeword block);
2) The total number, $N_{ZC}$, of bits loaded in the symbols that span at least 10 ms for the case of 50 Hz AC lines, and at least 8.33 ms for the case of 60 Hz AC lines or lines with no AC; or
3) The maximum fragment size $B_{max}$.

In one embodiment, the value of $B_{max}$=3072 bits is supported by all transmitter and receiver nodes. Support for $B_{max}$=6144 bits may be optional at both the transmitter and receiver.

In one embodiment, $B_0$ is rounded up to fit an integer number of OFDM symbol frames.

The number of fragments is $N_{frg}$=ceil($s \times N_{FEC}/B_0$), where s is the number of FEC codewords in the FEC codeword block. To obtain integer number of fragments, the FEC codeword block 901 is padded (903) with $N_{frg} * B_0 - N_{FEC}$ zeros.

The FRE (803) provides repetitions of fragments with the repetition rate of R. If R>1 is set, each fragment shall be copied R-1 times and all copies concatenated into the fragment buffer, FB (904), so that the first bit of each copy follows the last bit of previous copy. The total size of the FB is $B_0 \times R$ bits. FRE 803 supports the values R=1, 2, 4, where the value of R=1 corresponds to normal mode of operation. If R=1, an FB contains a single fragment of $B_0$ bits.

At the output of the payload encoder 800, a bit stream comprising individual buffers {$FB_i$} is available containing bits to be mapped to symbol frames. For any symbol frame, the desired number of bits, as determined by the bit allocation table, are read from the bit stream. The first symbol frame starts reading at the first (leftmost) bit of the symbol stream, and continues reading in the order $FB_1$, $FB_2$, etc.

Channel Interleaver

The fragment interleaver interleaves a block of $B_0$ bits, based on:
(i) the number of active subcarriers (ASC) per symbol frame; and
(ii) the bit allocation table {$b_i$} giving the number of bits allocated to the $i^{th}$ supported subcarrier.

Both the above quantities could depend on whether the interleaver fragment corresponds to header and data bits.

Given the above parameters, the fragment interleaver writes bits into a two-dimensional matrix, permutes them, and reads out the permuted bits. Specific rules are followed for reading and writing.

FIG. 10 illustrates the interleaving process according to one embodiment.

Step 1 (1001)—Calculation of parameters: The first step is to determine the number of rows and columns, and the row quantum parameter that determines the rules for reading and writing. The row quantum $\underline{b}$ is calculated as the largest integer less than or equal to the numerical average of {$b_i$}, i.e., $\underline{b}$=floor(mean({$b_i$})).

The number of columns, denoted m, is calculated as the integer closest to (ASC * mean({$b_i$})/$\underline{b}$).

The number of rows, denoted n, is $B_0$/m. The interleaver is defined only for sizes $B_o$ for which the number of rows is an integer multiple of the row quantum $\underline{b}$.

If the bit loading is flat, b equals the number of bits loaded in each active carrier, and m equals the number of active subcarriers. In this case, n equals the (total number of bits in the interleaver block/m), as required by G3. In this case, the number of bits in b rows exactly equals the total number of bits per symbol frame. If the bit loading is not flat, note that m does not necessarily represent the number of active subcarriers per OFDM symbol frame. Instead, it is chosen to ensure that the number of bits in b rows is within b bits of the total number of bits per OFDM symbol frame.

Step 2 (1002)—Writing into permutation matrix: With the above setup, input bits are now written into an n×m matrix as follows. Writing is done for one quantum of rows at a time. FIG. 11 illustrates the order of writing and reading into a permutation matrix according to one embodiment. Each box in FIG. 11 represents a bit. The number in the box indicates the position of the bit in the input bit stream. Thus, the first b rows are filled before writing into the next b rows, and so on. Within each quantum of rows, bits are written in column-first order. The first bit is written into the first row of the first column, the next is written in the second row of the first column, and so on until all b rows of the quantum are complete. Then the next bit is written into the first row of the second column, and so on.

Step 3 (1003)—Row-column permutation: The entries of the n×m are permuted. The relation between input and output interleaving indexes is determined from the following relations: original bit position (i, j) where i=0,1, . . . , m−1 and j=0,1, . . . , m−1.

Interleaved position (I, J) is given by:

$$J=(j*n\_j+i*n\_i)\% \, n$$

$$I=(i*m\_i+J*m\_j)\% \, m$$

where m_i, m_j, n_i, and n_j are selected based the values of m and n, under the constraint that $$m\_i, m\_j, n\_i, n\_j > 2$$

$$GCD(m\_i,m)=GCD(m\_j,m)=GCD(n\_i,n)=GCD(n\_j,n)=1$$

FIG. 12 is an example of row-column permutation that displays the spreading behavior of the interleaver for n=8, m=10, n_j=5, n_i=3, m_i=3 and m_j=7.

Step 4 (1004)—Reading from permuted matrix: Bits are read from the permutation matrix in the same order in which they were written.

In one embodiment, two interleaving modes are defined, depending on how the reading process transitions from one buffer to the next.

In the sub-zero crossing mode, all buffers—except the last one—are discarded immediately after the last bit in the buffer is read. If the last bit of the last buffer has been read and there is still a need for more bits to generate symbol frames, reading continues again from the beginning of the last buffer. In other words, the last buffer is read circularly until all bits required for symbol frame generation are available.

In the zero-crossing mode, a buffer is discarded when the number of bits read from it is $N_{ZC}$. In this mode, all buffers are read in a circular fashion if necessary.

In one embodiment, the sub-zero crossing mode is always used for the PHY header and in any case where the number of repetitions R is greater than one. For the case of one repetition (R=1), the mode may be chosen based in one of the following ways:

1) One possibility is to choose the mode based on accumulated noise statistics, which are either fed back from the receiver explicitly or implicitly determined by the transmitter. In this case, a bit is transmitted in the PHY header to indicate which mode is used for the data.

2) Alternatively, the zero crossing mode is used only when the number of OFDM symbols generated is an integer multiple of the minimum number of OFDM symbols spanning the zero crossing period. In this mode, no signaling of the mode is done since the receiver can obtain by the mode based on the known value of the number of symbols.

Another alternative is the first symbol frame starts reading at the first (leftmost) bit of the symbol stream. Except for the last buffer, every other buffer is discarded after its bits have been read. If the last bit of the last buffer has been read and there is still a need for more bits to generate symbol frames, reading continues again from the beginning of the last buffer. In other words, the last buffer is circularly read till all bits required for symbol frame generation are available.

Interleaving Depth For Various Bands

The number of tones in one zero-crossing interval for the various bands under consideration is given Table 10 for one embodiment.

TABLE 10

| BAND | NO. OF TONES/ SYMBOL | NO. OF SYMBOLS/ ZERO CROSSING | NO. OF TONES/ ZERO CROSSING |
|---|---|---|---|
| Cenelec-A | 36 | 14 | 504 |
| Cenelec-B | 17 | 14 | 238 |
| Cenelec-(C + D) | 13 | 14 | 182 |
| FCC | 107 | 23 | 2461 |

The interleaving depth is limited according to the following rules:

1) For the Cenelec bands, the maximum memory size of 2K bits is not relevant. The maximum interleaving depth is 10 ms times the number of repetitions used.
2) For the FCC band, the interleaving depth depends on the modulation scheme and the number of repetitions. With (QPSK+repetition-2), note that 2461 bits are contained in 10 ms and a 2K bit interleaver spans more than 80% of this. Simulation results show that a 2K bit interleaver handles most realistic cases without loss of performance.

Handling of Pad Bits and Other Corner Cases

With block interleavers, one corner case that should be handled is that the number of bits generated may not fit (i) an integer number of OFDM symbol frames, or (ii) desired depth in interleaving. Both of these cases are handled by making the last buffer circular.

Thus, if 300 bits are required for the last symbol frame and only 220 are available, then 80 more bits are read from the beginning of the last symbol frame. Thus, the first mentioned problem is solved and an integer number of OFDM symbol frames can always be generated.

Secondly, suppose the FEC output bits only span 34 ms (with repetitions), and these are divided into four blocks spanning {10, 10, 10, 4} ms respectively. The last block only contains 4 ms of data. If the noise conditions are estimated to be benign, the transmitter may just transmit 34 ms of OFDM symbol frames, in which case the last block is only interleaved over 4 ms. Otherwise, the transmitter may transmit OFDM symbols spanning 40 ms in which case the last block is circularly repeated as necessary to generate 40 ms. Thus, this structure gives the transmitter the flexibility to adjust the overhead to the channel conditions without requiring any additional signaling, as described below.

Signaling Required

Note that the receiver can identify the pad bits at all stages of processing, given only (i) the input number of bits $N_{FEC}$, which in turn is uniquely determined by the payload length and code rate, and (ii) the number of OFDM symbol frames. These two quantities need to be signaled anyway, so there is no additional signaling required to achieve the necessary padding.

Memory Requirement

The $N_{FEC}$ input bits are partitioned into one or more blocks. Both the interleaver and deinterleaver only require memory allotted for one block of bits (at most 2K bits in length), even if this block is repeated multiple times.

Specifically, at the receiver, every time an LLR is generated, the deinterleaver for the corresponding repeat is calculated and the LLR is accumulated at the deinterleaver output.

Of course, since processing of one block of bits/LLRs will take time, ping-pong buffers may be required for two successive blocks.

Performance Results

In this section, we provide simulation results to verify performance of the proposed interleaver. Table 11 shows the simulation parameters used for performance comparison.

TABLE 11

| BAND | FCC BAND |
|---|---|
| MCS | Coherent QPSK with repetition 1 and repetition 2 |
| Packet size | ~2 kbyte |
| # active tones | 150 active tones with 3.125 kHz tone spacing |
| Interleaver | 10 ms block interleaver, and 2048-bit block interleaver |
| Channel model | Time and frequency erasure channel |

In one embodiment, a simulation assumes a periodic noise model wherein a fraction of the band gets erased periodically in some fraction of the 10 ms duration between zero crossings. This is more realistic than assuming that the entire 468.75 kHz gets erased during the impulsive noise burst.

It may be questioned whether this is a realistic model instead of whole-symbol clipping. The main questions are what is the ADC dynamic range and whether an impulsive will result in the entire symbol clipping and causing the noise to spread out over the entire band. This depends on
(i) the energy of the impulsive noise relative to the signal;
(ii) the power of the impulsive noise when it is ON;
(iii) the automatic gain control (AGC) algorithm used; and
(iv) the dynamic range of the analog-to-digital converter.

If the impulsive noise is both high energy and high power (i.e., if its duty cycle is sufficiently high), the average energy is effectively dominated by the impulsive noise. Thus, any reasonable AGC algorithm will backoff so that the impulsive noise does not clip in the ADC samples. Subsequently, it is straightforward to identify the band in which the impulsive noise dominates and erase it. Note that the gains of doing so would be significant in cases where the impulsive noise is narrow in frequency.

Even in cases where the average energy is not dominated by the impulsive noise energy, the following conditions ensure that entire symbols are often not erased in the presence of narrowband impulsive noise 1) With narrowband impulsive noise, the peak-to-average power ratio (PAPR) is not as high as the desired OFDM signal. Further, since the impulse noise occurs at every zero crossing, the AGC could backoff sufficiently at the A/D converter, using an intelligent AGC algorithm, to ensure that the impulse noise is not clipped.
2) When the impulse noise power is 10-15 dB higher than the desired signal power, there is not much increased backoff at the ADC since an OFDM signal needs its own backoff of 10-15 dB at the ADC anyway. Hence, the increased backoff due to low PAPR impulse noise is not significant.
3) Even if a narrow burst of impulsive noise is clipping at say 12 dB above the signal's rms value, the effective noise is frequency domain is small enough (its energy is divided by the ratio of the impulsive noise burst duration to the OFDM symbol duration) that the entire symbol is not completely erased.

Consequently, we recommend that decisions not be based purely on erasure models, in particular for the FCC band which is broad enough to ensure many impulsive noise bursts affect only a fraction of the tones.

Under the assumptions listed above, and with coherent QPSK with repetition 2 in 20% time erasure and 20% frequency erasure channel, the performance difference between the 2048-bit interleaver and the 10 ms interleaver at 1e-2 FER is only 0.1 dB.

Under the assumptions listed above, and with coherent QPSK with repetition 2 in 20% time erasure and 50% frequency erasure channel, severe portions of the frequency bands are erased. In this channel, there is a 0.6 dB performance difference between two interleavers.

Under the assumptions listed above, and with coherent QPSK in 20% time erasure and 20% frequency erasure channel, the performance difference between 10 ms interleaver and the proposed interleaver is 0.8 dB.

Additional points to consider include:
1) If it turns out that indeed multiple symbols are wholly erased, the repetition ratio used would increase. This, in turn, makes the effective interleaver depth wider. Specifically, with 8 repetitions, the interleaver depth discussed here (corresponding to 2048 * 8 bits) is almost equal to 10 ms anyway.
2) In the above case, note that much greater gains can be obtained by using time-domain link adaptation.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. An electronic device comprising:
a forward error correction (FEC) encoder operable to:
perform convolutional encoding of a set of Reed-Solomon encoded blocks encoded on a set of blocks of a frame payload to produce a set of FEC blocks;
a fragmenter coupled to the FEC encoder and operable to receive the set of FEC blocks and divide the set of FEC blocks into a set of fragments;
a fragment repetition encoder coupled to the fragmenter and operable to receive the set of fragments and make a first number of copies of each fragment of the set of fragments to produce a set of repeated fragments;
an interleaver coupled to the fragment repetition encoder and operable to receive the set of repeated fragments and to interleave the set of repeated fragments to produce a set of interleaved fragments; and
a concatenator coupled to the interleaver and operable to receive the set of interleaved fragments and to concatenate the set of interleaved fragments to produce an encoded payload block.

2. The electronic device of claim 1, wherein each fragment of the set of fragments has a first size and each block of the set of FEC blocks has a size that is different from the first size.

3. The electronic device of claim 2, wherein the FEC encoder is further operable to pad the set of FEC blocks such that each fragment of the set of fragments has the first size.

4. The electronic device of claim 2, wherein the first size is selected based upon a total number of bits loaded on symbols that span at least 10 ms for a 50 Hz AC power line network, and at least 8.33 ms for a 60 Hz AC power line network.

5. The electronic device of claim 2, wherein the first size is less than or equal to 3072 bits.

6. The electronic device of claim 1, wherein the interleaver is operable to interleave the set of repeated fragments according to an Interleaving-over-AC-cycle (IoAC) mode and according to an Interleaving-over-Fragment (IoF) mode.

7. The electronic device of claim 6, wherein the FEC encoder is further operable to pad the set of FEC blocks based on whether the interleaver is to interleave the set of repeated fragments according to the IoAC mode or the IoF mode.

8. The electronic device of claim 1 further comprising:
a header FEC encoder operable to:
  receive a set of header blocks of a frame header;
  perform Reed-Solomon encoding on the set of header blocks to produce a set of Reed-Solomon encoded header blocks; and
  perform convolutional encoding of the set of Reed-Solomon encoded header blocks to produce a set of FEC header blocks;
a header repetition encoder operable to receive the set of FEC header blocks and to make a second number of copies of each block of the set of FEC header blocks to produce a set of repeated header blocks;
an header interleaver coupled to the header repetition encoder and operable to receive the set of repeated header blocks and to interleave the set of repeated header blocks to produce a set of interleaved header blocks; and
a header concatenator coupled to the header interleaver and operable to receive the set of interleaved header blocks and to concatenate the set of interleaved header blocks to produce an encoded header block.

9. The electronic device of claim 8 further comprising:
an orthogonal frequency division multiplexing (OFDM) unit coupled to the concatenator and to the header concatenator and operable to:
  receive the encoded payload block and the encoded header block; and
  map the encoded payload block and the encoded header block onto a set of OFDM symbols to produce a set of OFDM symbol frames.

10. The electronic device of claim 9 further comprising:
a transmitter coupled to the OFDM unit and operable to transmit the set of OFDM symbol frames over a power line.

11. The electronic device of claim 8 further comprising:
a scrambler coupled to the FEC encoder and the header FEC encoder and operable to:
  receive a set of payload bits and a set of header bits;
  scramble the set of payload bits to produce the set of blocks of the frame payload; and
  scramble the set of header bits to produce the set of header blocks of the frame header.

12. A method comprising:
performing convolutional encoding on a set of encoded blocks encoded from a set of blocks of a payload of a frame and having a first set of error correction code to add a second set of error correction code to the set of encoded blocks to produce a set of forward error correction (FEC) blocks;
dividing the set of FEC blocks into a set of fragments;
copying each fragment of the set of fragments a first number of times to produce a set of repeated fragments;
interleaving the set of repeated fragments to produce a set of interleaved fragments; and
concatenating the set of interleaved fragments to produce an encoded payload block.

13. The method of claim 12, further comprising performing a first encoding technique to produce the set of encoded blocks.

14. The method of claim 12 further comprising:
receiving a set of header blocks of the frame;
performing Reed-Solomon encoding on the set of header blocks to produce a set of Reed-Solomon encoded header blocks;
performing convolutional encoding of the set of Reed-Solomon encoded header blocks to produce a set of FEC header blocks;
copying each block of the set of FEC header blocks a second number of times to produce a set of repeated header blocks;
interleaving the set of repeated header blocks to produce a set of interleaved header blocks; and
concatenating the set of interleaved header blocks to produce an encoded header block.

15. The method of claim 14 further comprising mapping the encoded payload block and the encoded header block onto a set of orthogonal frequency division multiplexing (OFDM) symbols to produce a set of OFDM symbol frames.

16. The method of claim 12, wherein:
each fragment of the set of fragments has a first size; and
each block of the set of FEC blocks has a size that is different from the first size.

17. The method of claim 16 further comprising padding the set of FEC blocks based such that each fragment of the set of fragments has the first size.

18. The method of claim 17, wherein the padding pads by a number of bits determined by a technique used for the interleaving of the set of repeated fragments.

19. The method of claim 18, wherein the technique used for the interleaving is selected from a group consisting of: Interleaving-over-AC-cycle (IoAC) and Interleaving-over-Fragment (IoF).

20. The method of claim 17, wherein the first size is selected based upon a total number of bits loaded on symbols that span at least 10 ms for a 50 Hz AC power line network, and at least 8.33 ms for a 60 Hz AC power line network.

21. The method of claim 12, wherein a length of each of the set of fragments is determined based on a fixed number of bits and a number of bits transmitted in one semi-zero crossing interval.

22. The method of claim 15, further comprising transmitting the set of OFDM symbol frames over a power line.

* * * * *